United States Patent
Otanez et al.

(10) Patent No.: US 9,529,965 B2
(45) Date of Patent: Dec. 27, 2016

(54) CLUTCH SLIP RECOVERY SYSTEM AND METHOD

(75) Inventors: Paul G. Otanez, Troy, MI (US); Chunhao J. Lee, Troy, MI (US); Xu Chen, Ann Arbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1297 days.

(21) Appl. No.: 12/783,334

(22) Filed: May 19, 2010

(65) Prior Publication Data

US 2011/0190995 A1 Aug. 4, 2011

Related U.S. Application Data

(60) Provisional application No. 61/299,736, filed on Jan. 29, 2010.

(51) Int. Cl.
| | |
|---|---|
| *F16D 48/06* | (2006.01) |
| *G06F 19/00* | (2011.01) |
| *B60W 20/00* | (2016.01) |

(52) U.S. Cl.
CPC ............... *G06F 19/00* (2013.01); *B60W 20/40* (2013.01)

(58) Field of Classification Search
CPC ............... F16H 61/143; F16H 2061/145; F16H 2059/467; Y10T 477/755; Y10T 477/635; Y10T 477/6352; Y10T 477/638; Y10T 477/6425; Y10T 477/70

(Continued)

(56) References Cited

U.S. PATENT DOCUMENTS

| | | | | |
|---|---|---|---|---|
| 4,509,124 A | * | 4/1985 | Suzuki | F16H 45/02 192/3.28 |
| 4,940,122 A | * | 7/1990 | Fujieda | F16H 61/143 192/3.3 |

(Continued)

FOREIGN PATENT DOCUMENTS

DE 19708287 A1 9/1997

OTHER PUBLICATIONS

"Implementation of On-line Cluctch Pressure Estimation for Stepped Automatic Transmission", Watechagit, Sarawoot, Srinivasan, Krishnaswamy, American Control Conference, Jun. 8-10, 2005.*

(Continued)

*Primary Examiner* — Ryan Zeender
*Assistant Examiner* — Milena Racic

(57) ABSTRACT

A system and method for transferring torque from a prime mover to a transmission includes a coupling device, a hydraulic control system and a control module. The coupling device includes a torque converter clutch (TCC), where the coupling device is located between an output of the prime mover and an input of the transmission. The TCC is actuated between a fully engaged position, a slip mode where slip occurs, and a fully disengaged position. The hydraulic control system includes a controller device that communicates an actuation pressure to the TCC. The actuation pressure actuates the TCC between the fully engaged position, the slip mode, and the fully disengaged position. The controller is in communication with the TCC, the output of the prime mover, the input of the transmission, and the controller device of the hydraulic control system. The controller regulates the actuation pressure.

20 Claims, 2 Drawing Sheets

(58) Field of Classification Search
USPC ..................................................... 701/67, 68
See application file for complete search history.

(56) References Cited

U.S. PATENT DOCUMENTS

| | | | | |
|---|---|---|---|---|
| 5,474,506 A | * | 12/1995 | Palansky | ............... F16H 61/143 477/176 |
| 5,480,363 A | * | 1/1996 | Matsubara et al. | ............. 477/63 |
| 5,527,238 A | * | 6/1996 | Hrovat | ................. F16H 61/143 477/166 |
| 5,672,132 A | | 9/1997 | Schwab | |
| 6,066,069 A | * | 5/2000 | Vorndran | ............... F16H 61/143 477/38 |
| 6,139,472 A | * | 10/2000 | Harada | ................. F16H 61/143 477/169 |
| 6,556,910 B2 | | 4/2003 | Suzuki et al. | |
| 7,643,929 B2 | | 1/2010 | Stroh | |
| 8,010,265 B2 | | 8/2011 | Samie et al. | |
| 8,489,298 B2 | * | 7/2013 | Otanez | ................. F16H 61/143 477/166 |
| 2005/0245353 A1 | * | 11/2005 | Scelers | ......................... 477/127 |
| 2005/0266603 A1 | | 12/2005 | Findlater | |
| 2005/0268603 A1 | * | 12/2005 | Schweitzer et al. | ............ 60/330 |
| 2008/0214354 A1 | * | 9/2008 | Dickinson | ....................... 477/57 |
| 2008/0312800 A1 | * | 12/2008 | Satou | .................... F16H 61/143 701/68 |
| 2009/0150032 A1 | * | 6/2009 | Samie | ................. G01M 13/022 701/51 |
| 2009/0281699 A1 | * | 11/2009 | Mayumi et al. | ................ 701/66 |

OTHER PUBLICATIONS

Kerem Koprubasi, Modeling and control of a hybrid-electric vehicle for drivability and fuel economy improvements, 2008, Dissertation, The Ohio State University.*

* cited by examiner

CLUTCH SLIP RECOVERY SYSTEM AND METHOD

CROSS-REFERENCE TO RELATED APPLICATIONS

This application claims the benefit of U.S. Provisional Application No. 61/299,736, filed on Jan. 29, 2010, which is hereby incorporated in its entirety herein by reference.

FIELD

The present disclosure relates to a torque converter clutch (TCC) regulation system and method, and in particular to a TCC regulation system and method to pressurize a TCC at two different pressure levels.

BACKGROUND

The statements in this section merely provide background information related to the present disclosure and may or may not constitute prior art.

Vehicle powertrains typically include a prime mover, such as an internal combustion engine, a transmission and a coupling device that transfers drive torque from the prime mover to the transmission. The coupling device can be a torque converter that provides a fluid coupling and regulates slip between an output shaft of the prime mover and an input shaft of the transmission. As the output shaft accelerates, the input shaft is induced to accelerate through the fluid coupling. A torque converter clutch (TCC) is provided to provide a direct drive between the output shaft and the input shaft once the speed of the input shaft is sufficiently close to the speed of the output shaft.

Once the TCC is fully engaged or locked up, it is generally desirable to restore slip in the most minimum amount of time as possible. One approach to quickly restore slip is by significantly reducing the pressure in the TCC. This approach is commonly referred to as the single pressure change (SPC), which includes reducing the TCC pressure by a predetermined magnitude. However, this approach can result in the TCC pressure command being too large, which results in an excessive increase in slip that reduces fuel economy. Alternatively, the TCC pressure command may be too small, which results in the slip not being restored quickly enough.

While current torque converters and TCCs achieve their intended purpose, there is a need for a new and improved vehicle powertrain which exhibits improved performance from the standpoint of quickly restoring slip after the TCC is fully engaged without excessive slip.

SUMMARY

The present invention provides a torque converter clutch regulation (TCC) system and method for transferring torque from a prime mover to a transmission. The system includes a coupling device having a torque converter clutch (TCC), where the coupling device is located between the output of the prime mover and the input of the transmission. The TCC is actuated between a fully engaged position, a slip mode where slip occurs, and a fully disengaged position. The system also includes a hydraulic control system having a controller device that communicates an actuation pressure to the TCC. The actuation pressure actuates the TCC between the fully engaged position, the slip mode, and the fully disengaged position. The system includes a controller that is in communication with the TCC, the output of the prime mover, the input of the transmission, and the controller device of the hydraulic control system. The controller regulates the actuation pressure.

The controller includes a first control logic for monitoring the rotational speed of the output of the prime mover and the input of the transmission. The controller further includes a second control logic for determining slip, where slip is the difference between a rotational speed of the output of the engine and a rotational speed of the input of the transmission. The controller includes third control logic for determining if the slip of the TCC is below a threshold value. The controller further includes a fourth control logic for adjusting the actuation pressure to a first pressure level if the slip of the TCC exceeds the threshold value, where the first pressure causes the slip of the TCC to increase. The controller also includes a fifth control logic for holding the controller device to the first pressure for a predetermined amount of time. Finally, the controller includes a sixth control logic for switching the actuation pressure from the first pressure level to a second pressure level. The first pressure level is less than the second pressure level and the second pressure level causes the slip of the TCC to decrease.

In an embodiment of the present invention, the first pressure level is experimentally determined by vehicle testing.

In an embodiment of the present invention, the threshold value represents when the TCC is in the fully engaged position and the slip is about zero.

In another embodiment of the present invention, the controller further includes a seventh control logic for calculating the second pressure level.

In yet another embodiment of the present invention, the second pressure level is calculated by multiplying the first pressure level by a constant. The constant R is a predetermined value that is greater than zero and less than one.

In an embodiment of the present invention, the second pressure level is a learned value that is calculated during a previous occurrence when the TCC was in the fully engaged position and the controller decreased the actuation pressure.

In another embodiment of the present invention, the controller includes a plurality of look up tables stored in memory. The look up tables determine the second pressure level based on a desired slip of the TCC and an engine torque.

In yet another embodiment of the present invention, a stochastic signal detector that receives data signals indicating slip and the data signals are sent to the controller is included. The data signals are combined with data representing an empirically determined torque converter model and an engine torque value.

In an embodiment of the present invention, the torque converter model is a Kotwicki model or a K-factor model.

In another embodiment of the present invention, the predetermined amount of time ranges between about 0.001 to about 1.0 seconds.

In yet another embodiment of the present invention, a time needed to switch between the first pressure level and the second pressure level is 0.001 seconds, and normal operating conditions of the TCC will resume and slip regulation takes place after the actuation pressure is set to the second pressure level.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
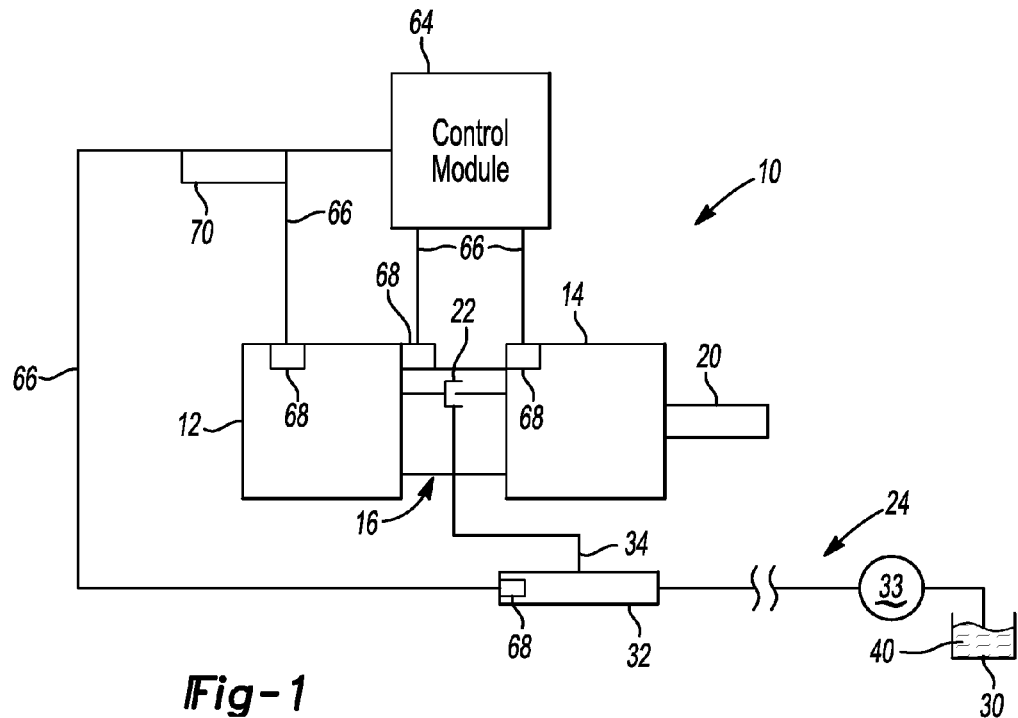
FIG. 1 is a block diagram of an exemplary vehicle powertrain that includes a torque converter and a torque converter clutch (TCC)

With reference to FIG. 1, an exemplary powertrain 10 is illustrated schematically and includes a prime mover or engine 12 that drives a transmission 14 through a coupling device 16. The coupling device 16 is any fluid coupling that transfers drive torque from the engine 12 to the transmission 14 such as, for example, a torque converter. The transmission 14 multiplies the drive torque by a desired gear ratio to provide a modified drive torque. The modified drive torque is transferred to a vehicle driveline (not shown) by a transmission output shaft 20. The coupling device 16 includes a torque converter clutch (TCC) 22, which is selectively engageable to provide a direct drive between the engine 12 and the transmission 14. The powertrain 10 also includes a hydraulic control system 24 having a hydraulic fluid source 30, a pump 33 and a controller device 32. The controller device 32 is fluidly connected to the pump 33 and the TCC 22, where the controller device 32 is supplied with a hydraulic fluid 40 from the hydraulic fluid source 30 through the pump 33. The controller device 32 is any device that regulates the flow of the hydraulic fluid 40 and communicates an actuation pressure P to the TCC 22 through a hydraulic connection 34. For example, the controller device 32 can be a solenoid or a valve body including a plurality of valves. The magnitude of the actuation pressure P is adjusted accordingly to actuate the TCC 22. In one embodiment, the actuation pressure P is communicated to a clutch pack of the coupling device 16 (not shown) that actuates the TCC 22.

Figure 2:
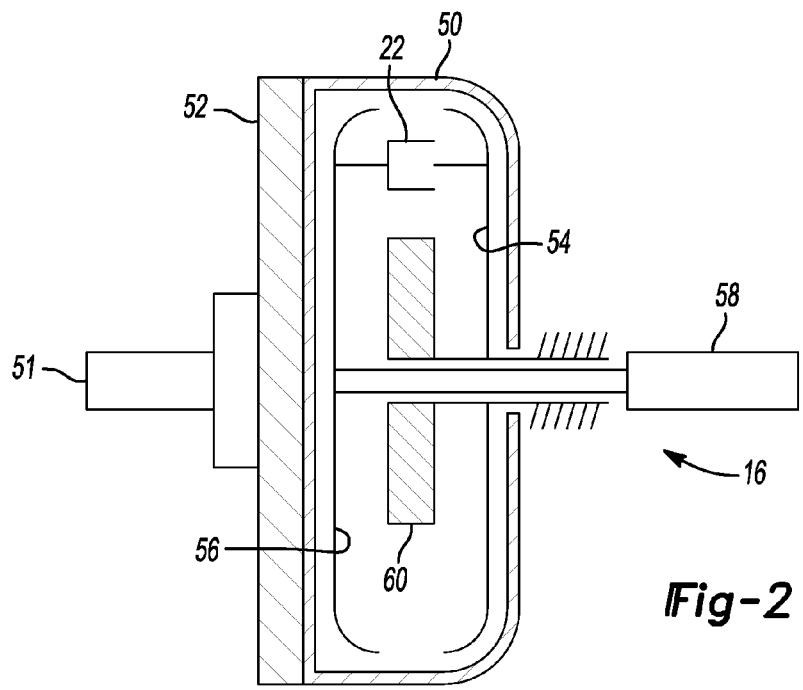
FIG. 2 is a schematic illustration of an exemplary torque converter implemented in the exemplary powertrain illustrated in FIG. 1.

Referring now to FIG. 2, the coupling device 16 is illustrated as an exemplary torque converter that provides a fluid coupling between the engine 12 and the transmission 14. The torque converter 16 includes a housing 50 that is fixed for rotation with a crankshaft 51 via a flywheel 52. An impeller 54 is fixed for rotation with the housing 50 and a turbine 56 is fixed for rotation with a transmission input shaft 58. A stator 60 is also provided and is fixed from rotation. The interior of the torque converter 16 is filled with a viscous fluid. Rotation of the impeller 54 induces corresponding motion of the viscous fluid, which is directed towards the turbine 56 by the stator 60 to induce rotation of the turbine 56. While the coupling device 16 is described as a simplified torque converter, it should be appreciated that the coupling device 16 may take various other forms without departing from the scope of the present invention.

As the crankshaft 51 rotates at an idle speed, the impeller 54 is induced to rotate. However, the idle speed is normally insufficient to overcome braking forces that inhibit the turbine 56 from rotating. As the braking forces are reduced or the engine speed increases, the impeller 54 drives the viscous fluid into the turbine 56 and the turbine 56 is induced to rotate. As a result, drive torque is transferred through the transmission 14 to propel the vehicle (not shown). Upon achieving a point where there is little or no RPM difference between the turbine 56 and impeller 54, the TCC 22 is in a fully engaged position to provide a direct drive between the engine 12 and the transmission 14. Under this condition, the rotational speed of the turbine 56 is about equal to the engine RPM speed.

A slip mode of the TCC 22 is also included. The slip is determined as the difference between the rotational speed of the crankshaft (not shown) of the engine 12 and the rotational speed of the transmission input shaft 58, where the transmission input shaft 58 is employed to transmit power from the coupling device 16 to the transmission 14. The slip mode occurs by changing the actuation pressure P that is supplied to the TCC 22 by the hydraulic control system 24 (FIG. 1). The magnitude of the actuation pressure P is at about a maximum value when the TCC 22 is in the fully engaged position. As the actuation pressure P is decreased, the TCC 22 transitions from the fully engaged position to a fully disengaged position.

Turning back to FIG. 1, a control module 64 regulates operation of the powertrain 10 based on operating parameters. The control module 64 is preferably an electronic control device having a preprogrammed digital computer or processor, control logic, memory used to store data, and at least one I/O peripheral. The control logic includes a plurality of logic routines for monitoring, manipulating, and generating data. The control module 64 controls the actuation of the TCC 22 via the hydraulic control system 24 according to the principles of the present disclosure. The control module 64 is in communication with a data link 66 that connects the control module 64 to a plurality of sensors 68 for monitoring the controller device 32, the slip of the TCC 22, and the engine 12. The data link 66 may be any type of bidirectional communication interface, such as, for example, a wireless network or data communication lines. The data link 66 connects the control module 64 with the sensor 68 of the controller device 32, where the sensor 68 monitors the actuation pressure P. The data link 66 connects the control module 64 with the sensor 68 of the engine 12 that monitors the rotational speed of the crankshaft (not shown) of the engine 12, which is used to determine the actual engine speed. The data link 66 connects the control module 64 with the sensor 68 of the coupling device 16. Specifically, the sensor 68 monitors the rotational speed of the turbine 56 that is fixed for rotation with the transmission input shaft 58 (FIG. 2). The difference between the rotational speed of the engine 12 and the turbine 56 is the slip speed of the TCC 22. The data link 66 also connects the control module 64 with the sensor 68 of the engine 12, where the sensor 68 monitors an engine torque Tq.

In one embodiment, a stochastic signal detector 70 is in communication with the sensors 68 of the engine 12 and the turbine 56. The stochastic signal detector 70 receives data signals indicative of the rotational speed of both the crankshaft of the engine 12 as well as the rotational speed of the turbine 56, where the data signals received from the sensor 68 may contain statistical fluctuations in statistical properties such as, for example, mean and variance. Because the data signals may contain fluctuations, the stochastic signal detector 70 includes circuitry or control logic that is used to detect the rotational speed of the engine 12 and the turbine 56 using stochastic computation.

Figure 3:
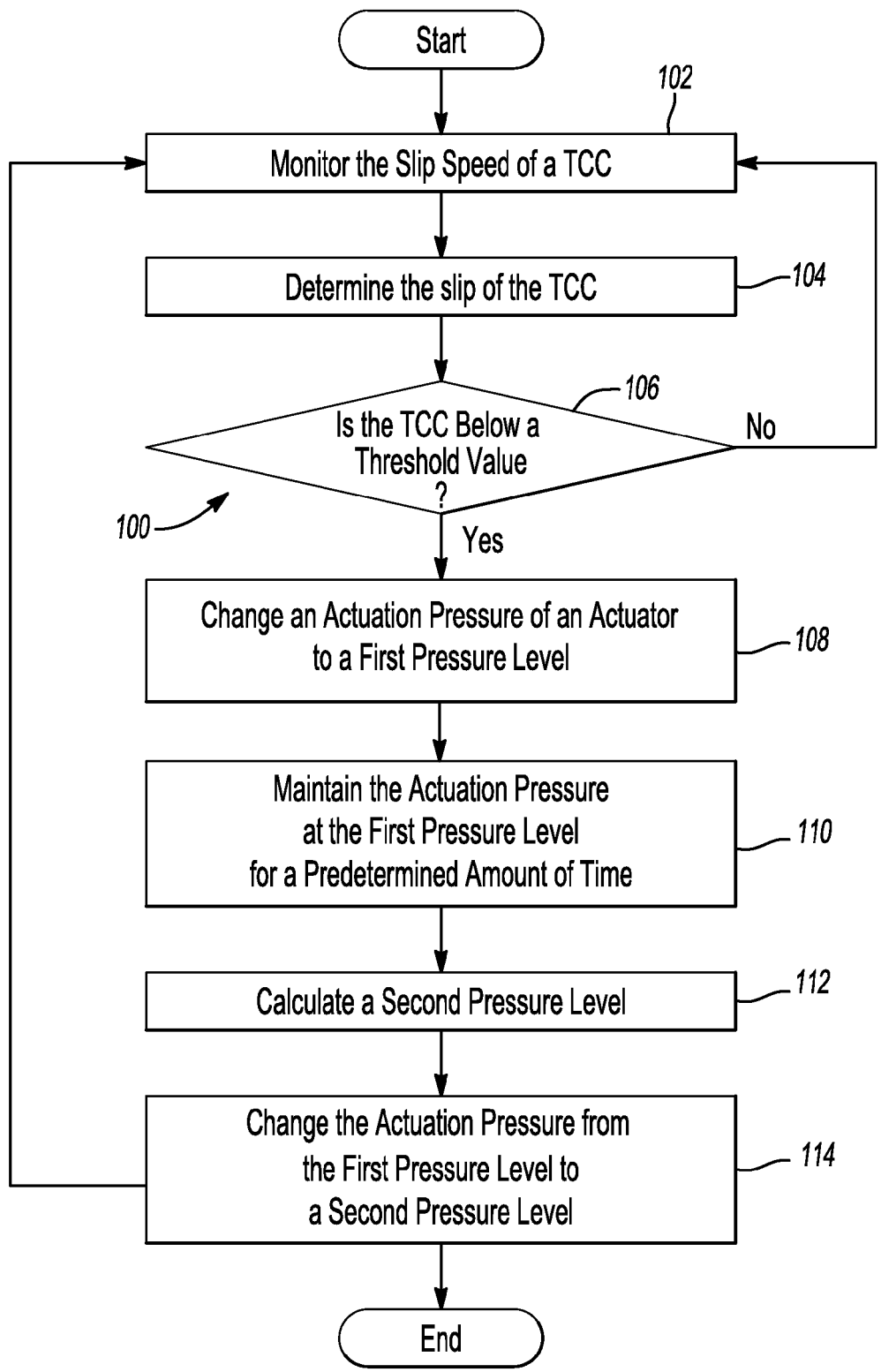
FIG. 3 is a process flow diagram illustrating a method of operating the TCC illustrated in FIG. 1.

Turning now to FIG. 3, and with continued reference to FIGS. 1-2, a method for controlling the transmission 14 when the TCC 22 is generally indicated by reference number 100. The method 100 begins at step 102 where the control module 64 includes a control logic for monitoring the slip speed of the TCC through the sensors 68 that are in communication with the engine 12 and the turbine 56. The data link 66 connects the control module 64 with the sensor 68 of the engine 12 that monitors the rotational speed of the crankshaft, as well as the sensor 68 that monitors the rotational speed of the turbine 56. The sensors 68 are in communication with the control module 64 though the data link 66. The method 100 then proceeds to step 104.

In step 104, the control module includes control logic for determining the slip of the TCC 22. The slip is calculated by determining the difference between the rotational speed of the crankshaft of the engine 12 and the turbine 56. Specifically, the control module 64 compares the rotational speed of the crankshaft of the engine 12 with the rotational speed of the turbine 56, where the rotational speed of the turbine 56 is fixed for rotation with the transmission input shaft 58 (FIG. 2). The difference between the rotational speed of the engine 12 and the turbine 56 is the slip of the TCC 22. The method 100 then proceeds to step 106.

In step 106, the control module 64 includes a control logic for determining if the slip of the TCC 22 is below a threshold value. In one exemplary embodiment, the threshold value represents when the TCC 22 is in the fully engaged position and the slip is about zero, however it is understood that the threshold value can be set to other values as well. In one embodiment, the threshold value is a function of the number of test samples considered and the desired probability of a false alarm, although other approaches may be used as well. Despite which approach is used the threshold value should minimize detection time while maximizing accuracy. When the TCC 22 is in the fully engaged position, the rotational speed of the engine 12 is about equal to the rotational speed of the transmission input shaft 58. Method 100 may then proceed to step 108.

In step 108, the control module 64 includes control logic for changing the actuation pressure P to a first pressure level P1. The first pressure level P1 is less than the actuation pressure P when the slip of the TCC 22 is below the threshold value. Reducing the actuation pressure P to the first pressure level P1 causes the slip of the TCC 22 to increase. For example, if the TCC 22 was fully engaged at the actuation pressure P, reducing the actuation pressure P to the first pressure level P1 causes the TCC 22 to disengage from the fully engaged position and into the slip mode. The slip mode occurs when the actuation pressure P that is supplied to the TCC 22 by the hydraulic control system 24 (FIG. 1) is decreased, and the engine RPM speed is no longer about the same as the RPM of the transmission input shaft 58. As the actuation pressure P is decreased, the TCC 22 transitions from the fully engaged position to a fully disengaged position. In one embodiment, the stochastic signal detector 70 receives data signals indicative of the rotational speed of the engine 12 and the rotational speed of the turbine 56. The stochastic signal detector 70 is used to determine the slip of the TCC 22 based on the data signals indicative of the rotational speed of the crankshaft of the engine 12 and the turbine 56. The stochastic signal detector 70 sends a data signal indicative of the slip of the TCC 22 to the control module 64. The control module 64 then adjusts the actuation pressure P to the first pressure level P1 by sending data though the data link 66 to the controller device 32. Method 100 may then proceed to step 110.

In step 110, the control module 64 includes a control logic for maintaining the actuation pressure P at the first pressure level P1 for a predetermined amount of time t. In one example, the predetermined amount of time t is usually about a few tenths of a second such, for example, between about 0.001 to about 1.0 seconds. However, those skilled in the art will appreciate that the predetermined amount of time t can be set to other time increments as well. The first pressure level P1 is maintained for the predetermined amount of time t at a constant level. While the first pressure level P1 is being maintained at the time t, any active slip feedback control logic of the control module 64 should typically be disabled. Method 100 may then proceed to step 112.

In step 112, the control module 64 includes a control logic for calculating a second pressure level P2. The first pressure level P1 is less than the second pressure level P2, however the second pressure level P2 will also cause the TCC 22 to be in the slip mode. The first pressure level P1 is an overshoot, where the actuation pressure P is decreased in the most minimum amount of time possible in an effort to increase the slip of the TCC 22 as quickly as possible. The second pressure level P2 creates the desired amount of slip from the TCC 22, and is the amount of slip found during steady-state operation of the powertrain 10. Switching from the first pressure level P1 to the second pressure level P2 causes the slip of the TCC 22 to not increase excessively, which in turn improves fuel economy of the vehicle.

In one embodiment, the first pressure level P1 is determined by vehicle testing. Specifically, testing is performed to determine the value of the first pressure level P1 that produces a relatively large drop in the actuation pressure P, and an empirical value is used to calculate how much pressure should be added to achieve the second pressure level P2. For example, the first pressure level P1 can be experimentally determined by testing a vehicle. The vehicle can include either a longitudinal or a transverse transmission, and can also include any size engine, such as a four, six or eight cylinder engine. Moreover, any type of vehicle, such as a small passenger vehicle or a heavy duty truck may be used.

The second pressure level P2 can be calculated using several different approaches. For example, in one embodiment the second pressure P2 is calculated by multiplying the first pressure P1 by a constant R, where the constant R is a predetermined value that is greater than zero and less than one. Multiplying the constant R by the first pressure level P1 will result in the desired amount of slip from the TCC 22, which is the second pressure level P2. In another embodiment, the difference between the first pressure level P1 and the second pressure level P2 is a learned value that is calculated during a previous occurrence when the TCC 22 was fully engaged, where the control module 64 decreased the actuation pressure P. In yet another embodiment, the control module 64 has a variety of look up tables stored in memory. The look up tables determine the second pressure level P2 based on factors such as, for example, desired slip of the TCC 22 or engine torque Tq.

Alternatively, in another embodiment, the data signals from the sensors 68 for monitoring the slip speed of the TCC 22 are processed through the stochastic signal detector 70. These data signals are sent to the control module 64, and then combined with data representing an empirically determined torque converter model and the engine torque Tq from the sensor 68 monitoring the engine 12. One example of a torque converter model is the Kotwicki model, which can be found in SAE paper No. 820393 1983 and is herein incorporated by reference in its entirety. In another embodiment, the model can be based on the K-factor of the torque converter, which is the engine speed in revolutions-per-minute (RPM) divided by the square root of the engine torque output. The K-factor value provides a relative indication of the efficiency of the torque converter. The control module 64 includes control logic for determining the second pressure level P2 based on the actuation pressure P, the engine torque Tq, and the torque converter model. Once the control module 64 determines the second pressure level P2, the method 100 can then proceed to step 114.

In step 114, the control module 64 includes a control logic for changing the actuation pressure P of the controller device 32 from the first pressure P1 to the second pressure P2. The second pressure P2 creates the amount of slip in the TCC 22 that is found during steady-state operation of the powertrain 10. In one embodiment, time needed to switch between the first pressure level P1 and the second pressure level P2 is a small value such as, for example, about 0.001 seconds. However, those skilled in the art will appreciate that the switching time between the first and second pressure levels can be any desired time increment. After the control module 64 switches the actuation pressure P to the second pressure level P2, normal operation of the TCC 22 may resume and slip regulation will take place. Method 100 may then either terminate, or return to step 102, where the slip speed of the TCC 22 continues to be monitored.

By employing a first pressure level P1 and a second pressure P2 in the controller device 32, the actuation pressure P of the TCC 22 can quickly adjust as needed if the TCC 22 is in the fully engaged. Moreover, the actuation pressure P of the TCC 22 can also be adjusted in the event that the slip of the TCC 22 needs to be quickly recovered. The controller device 32 can adjust the actuation pressure P to the first pressure level P1 to disengage the TCC 22 from the fully engaged position. Once the actuation pressure P of the controller device 32 is adjusted to the first pressure level P1, the control module 64 then adjusts the actuation pressure P to the second pressure level P2 after a predetermined amount of time t. Adjusting the actuation pressure P2 to the second pressure level P2 will minimize slip of the TCC 22, which in turn improves fuel economy of the powertrain 10.

The description of the invention is merely exemplary in nature and variations that do not depart from the gist of the invention are intended to be within the scope of the invention. Such variations are not to be regarded as a departure from the spirit and scope of the invention.

What is claimed is:

1. A system for transferring torque from an output of a prime mover to an input of a transmission, comprising:
    a coupling device including a torque converter clutch (TCC) where the coupling device is located between the output of the prime mover and the input of the transmission, wherein the TCC is actuated between a fully engaged position, a slip mode where slip occurs, and a fully disengaged position;
    a hydraulic control system including a controller device that communicates an actuation pressure to the TCC, wherein the actuation pressure actuates the TCC between the fully engaged position, the slip mode, and the fully disengaged position; and
    a controller in communication with the TCC, the output of the prime mover, the input of the transmission, and the controller device of the hydraulic control system, wherein the controller regulates the actuation pressure, the controller comprising:
        a first control logic for monitoring the rotational speed of the output of the prime mover and the input of the transmission;
        a second control logic for determining slip, wherein slip is the difference between a rotational speed of the output of the engine and a rotational speed of the input of the transmission;
        a third control logic for determining if the slip of the TCC is below a threshold value;
        a fourth control logic for adjusting the actuation pressure to a first pressure level if the slip of the TCC is below the threshold value of the third control logic, wherein the first pressure level causes the slip of the TCC to increase;
        a fifth control logic for holding the controller device to the first pressure for a predetermined amount of time; and
        a sixth control logic for switching the actuation pressure from the first pressure level to a second pressure level, wherein the first pressure level is less than the second pressure level and the second pressure level causes the slip of the TCC to decrease.

2. The system as recited in claim 1 wherein the first pressure level is determined by vehicle testing.

3. The system as recited in claim 1 wherein the threshold value represents when the TCC is in the fully engaged position and the slip is about zero.

4. The system as recited in claim 1 wherein the controller further includes a seventh control logic for calculating the second pressure level.

5. The system as recited in claim 4 wherein the second pressure level is calculated by multiplying the first pressure level by a constant, wherein the constant is a predetermined value that is greater than zero and less than one.

6. The system as recited in claim 4 wherein the second pressure level is a learned value that is calculated during a previous occurrence when the TCC was in the fully engaged position and the controller decreased the actuation pressure.

7. The system as recited in claim 4 wherein the controller includes a plurality of look up tables stored in memory and the look up tables determine the second pressure level based on a desired slip of the TCC and an engine torque.

8. The system as recited in claim 4 further including a stochastic signal detector that receives data signals indicating slip and the data signals are sent to the controller, and wherein the data signals are combined with data representing an empirically determined torque converter model and an engine torque value.

9. The system as recited in claim 8 wherein the torque converter model is one of a Kotwicki model and a K-factor model.

10. The system as recited in claim 1 wherein the predetermined amount of time ranges between about 0.001 to about 1.0 seconds.

11. The system as recited in claim 1 wherein a time needed to switch between the first pressure level and the second pressure level is about 0.001 seconds, and normal operating conditions of the TCC will resume and slip regulation takes place after the actuation pressure is set to the second pressure level.

12. A method of transferring torque from an output of a prime mover to an input of a transmission, wherein a coupling device including a torque converter clutch (TCC) is included, and the coupling device is located between the output of the prime mover and the input of the transmission, and wherein the TCC includes a fully engaged position, a slip mode, and a fully disengaged position, and a hydraulic control system includes a controller device that communicates an actuation pressure to the TCC, wherein the TCC is actuated by the actuation pressure between the fully engaged position, the slip mode, and the fully disengaged position, the method comprising:
  monitoring the rotational speed of the output of the prime mover and the input of the transmission by a controller that is in communication with the TCC, the output of the prime mover, the input of the transmission, and the controller device;
  determining slip, wherein slip is the difference between a rotational speed of the output of the engine and a rotational speed of the input of the transmission;
  determining if the slip of the TCC is below a threshold value;
  changing an actuation pressure to a first pressure level if the slip of the TCC is below the threshold value, wherein the first pressure level causes the slip of the TCC to increase;
  maintaining the actuation pressure at the first pressure for a predetermined amount of time; and
  changing the actuation pressure from the first pressure level to a second pressure level, wherein the first pressure level is less than the second pressure level and the second pressure level causes the slip of the TCC to decrease.

13. The method as recited in claim 11 further comprising the step of determining the first pressure level by vehicle testing.

14. The method as recited in claim 11 further comprising the step of establishing the threshold value to represent when the TCC is in the fully engaged position and the slip is about zero.

15. The method as recited in claim 11 further comprising the step of calculating the second pressure level.

16. The method as recited in claim 15 further comprising the step of calculating the second pressure by multiplying the first pressure level by a constant, wherein the constant R is a predetermined value that is greater than zero and less than one.

17. The method as recited in claim 15 further comprising the step of establishing the second pressure level as a learned value that is calculated during a previous occurrence when the TCC was in the fully engaged position and the actuation pressure was decreased.

18. The method as recited in claim 15 further comprising the step of including a plurality of look up tables stored in a memory of the controller, wherein the look up tables determine the second pressure level based on a desired slip of the TCC and an engine torque.

19. The method as recited in claim 15 further comprising the step of including a stochastic signal detector that receives data signals indicating slip, wherein the data signals are sent to the controller, and wherein the data signals are combined with data representing an empirically determined torque converter model and an engine torque value.

20. The method as recited in claim 19 wherein the torque converter model is one of a Kotwicki model and a K-factor model.

* * * * *